(12) United States Patent
Dean, Jr. et al.

(10) Patent No.: US 6,688,782 B1
(45) Date of Patent: Feb. 10, 2004

(54) UNIVERSAL FERRULE

(75) Inventors: David L. Dean, Jr., Hickory, NC (US);
Rodney Throckmorton, Newton, NC (US); Karl M. Wagner, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/379,392

(22) Filed: Aug. 23, 1999

(51) Int. Cl.[7] ............................... G02B 6/38
(52) U.S. Cl. .................. 385/78; 385/60; 385/72
(58) Field of Search ................ 385/53–56, 58–60, 385/62–63, 65–73, 78, 81, 83–86

(56) References Cited

U.S. PATENT DOCUMENTS

| | | | | |
|---|---|---|---|---|
| 5,463,709 A | * | 10/1995 | Terao et al. | 385/85 |
| 5,940,561 A | * | 8/1999 | Dean, Jr. et al. | 385/60 |
| 6,149,313 A | * | 11/2000 | Giebel et al. | 385/59 |
| 6,173,097 B1 | * | 1/2001 | Throckmorton et al. | 385/59 |
| 6,350,062 B2 | * | 2/2002 | Knecht et al. | 385/84 |

* cited by examiner

Primary Examiner—Frank G. Font
Assistant Examiner—Michael P. Mooney

(57) ABSTRACT

A universal ferrule for use within a plurality of optical fiber connector types includes a longitudinally extending ferrule body having an opposing end face and base. The ferrule body defines an internal passageway at the base and at least one bore at the end face. The base is sized and shaped to engage an internal chamber within the housing of each connector type to rotationally, radially and longitudinally position the at least one bore relative to the connector housing. The ferrule body has a cylindrical external surface that includes at least one longitudinal groove. A first groove portion adjacent the end face is sized and shaped to position the universal ferrule relative to a mating ferrule. A second groove portion adjacent the base is larger than the first groove portion. A chamfered edge between the end face and the external surface of the ferrule body facilitates interconnection of mating ferrules.

30 Claims, 7 Drawing Sheets

UNIVERSAL FERRULE

FIELD OF THE INVENTION

The present invention relates to ferrules and associated optical fiber connectors, and, more particularly, to a ferrule that may be universally used with a plurality of connectors.

BACKGROUND OF THE INVENTION

The use of optical fiber for transmitting information, such as data or voice communications, is increasing. Optical fiber offers advantages over traditional copper wire due to the improved transmission speed and larger information capacity for the same sized cable, among other reasons. Due to the proliferation of uses for optical fiber, there has been a corresponding proliferation of connectors used to terminate and couple one or more optical fibers to other optical fibers or to other terminals. These connectors include connectors for a single optical fiber, for two optical fibers, and for more than two optical fibers (usually in multiples of two). Connectors for two or more optical fibers are desirable since they allow simultaneous transmission and reception of information.

Such connectors include configurations that generally define the positioning of the one or more optical fibers within the connector, as well as the structure for securing the connector to other connectors or terminals. For example, a number of different types of connectors for a single optical fiber include SC, FC, ST, and D4 connectors. Similarly, a number of different types of connectors for two optical fibers include the MT and MT-RJ connectors, as well as the SC-DC™ and UNICAM® connectors produced by the assignee of the present invention.

Even though numerous types of connectors exist, some of the connector components between the types are similar. For example, each type of connector generally includes a ferrule for terminating at least one optical fiber and a housing for holding the ferrule and coupling with other connectors or terminals. A ferrule typically has a shaft-like body and a base. Generally, a ferrule with a circular base has a corresponding cylindrical body, while a ferrule with a square or rectangular base has a square or rectangular shaft-like body. The base engages an internal chamber within the housing to position the ferrule. Meanwhile, the shaft-like body positions the one or more optical fibers relative to corresponding fibers in a mating connector or terminal.

Although similar, the components for one type of connector generally cannot be used in another type of connector. In particular, ferrules are generally not interchangeable among connector types. Typically, there are differences in the internal structures of the housings of the connectors, thus requiring different shaft-like bodies and/or bases for the ferrule. As mentioned above, the internal housing structure may require a ferrule having a round, square, or rectangular base and/or shaft. As such, ferrules with square bases typically do not fit properly within connector housings having round internal structures, and vice versa. This lack of interchangeability of ferrules between connector types requires extra cost in manufacturing, where extra equipment is required to produce the various ferrules, and extra time is spent to manage, schedule, and stock the various ferrules. Also, the multitude of required ferrules adds time and cost to installation and replacement of connectors, as the proper ferrule must be determined and kept in stock.

Further, differences in the external surface of the body of the ferrule lead to problems in aligning mating ferrules. The alignment of optical fibers within mating ferrules is often dependent on the external surface of each ferrule, as coupling sleeves and/or guide pins often engage these surfaces to align the ferrules. With single fiber ferrules, the fiber is typically aligned along the central axis of the ferrule such that rotation of the ferrule does not cause misalignment between mating fibers. In contrast, multi-fiber ferrules, which typically include 2, 4, 8, 12, or 24 fibers, cannot allow rotation between mating ferrules as the fibers would become misaligned. The engagement of the ferrule base with the internal housing of the connector provides an initial alignment. But, as mentioned above, more precise alignment is provided by coupling sleeves and/or guide pins that engage the external surface of the ferrule. The ferrules or the coupling sleeves for ferrules have alignment devices, such as guide pins, ribs, or a portion of a guide pin, to align mating ferrules and prevent rotation between the ferrules. It is often difficult to maintain the required dimensional tolerances on the external body surface, especially for molded thermoplastic ferrules, to guarantee proper alignment of mating ferrules. Further, any misalignment during the initial engagement of the ferrule with an alignment sleeve or guide pin can lead to chipping or scraping of material from the surface of the ferrule, thereby causing further alignment problems.

Thus, a ferrule that is adapted for universally fitting within a multitude of types of connectors is desired. Further, a ferrule having improved alignment with a mating ferrule is also desired. Finally, a ferrule having a body that more easily aligns with a guide pin or sleeve for connection with another ferrule is desired. Therefore, a universal ferrule with enhanced alignment features is desired.

SUMMARY OF THE INVENTION

The present invention advantageously includes a universal ferrule for positioning at least one optical fiber within a plurality of types of optical fiber connector housings. Preferably, the plurality of types of housings include single fiber and multiple fiber housings. The universal ferrule includes a longitudinal body having first and second ends, where the body further includes at least one longitudinal bore for receiving the optical fiber extending between the ends. The universal ferrule includes an end face at the first end, where the end face interfaces with a corresponding end face of a mating ferrule. Further, the universal ferrule includes a base adapted to interchangeably engage a plurality of connector housings to, inter alia, position the ferrule relative to the housing. The base preferably radially extends outwardly from the body and is sized and shaped to rotationally, radially, and longitudinally position the ferrule relative to the housing. In one embodiment, the base includes at least two substantially flat side portions that are adapted to engage the corresponding housing. In another embodiment, the base is substantially rectangular and has edges that are adapted to fit within various shaped housings, including circular, arcuate, square, and rectangular housings.

Further, the body of the universal ferrule is preferably cylindrical. The cylindrical body may include at least one longitudinal groove adapted for positioning the ferrule relative to a mating ferrule. The groove may additionally include a first groove portion adjacent to the first end and a second groove portion adjacent to the second end. In this embodiment, only the first groove portion is adapted for positioning the universal ferrule relative to a mating ferrule. As such, the first groove portion is typically smaller in size than the second groove portion. Preferably, the first and second groove portions have a first and second radius, respectively, where the first radius is less than the second radius. Other configurations for the groove, such as square, rectangular, v-shaped, or arcuate-shaped channels, may also be utilized.

Further, in one embodiment, the present invention comprises a system for terminating an optical fiber cable having at least one optical fiber. The system includes a connector type, selected from a plurality of optical fiber connectors, that includes a housing having an internal chamber. The system also includes a universal ferrule adapted for insertion within the internal chamber to position the ferrule relative to the housing. The ferrule includes a body and base, similar to those described above, where the base is adapted to engage the internal chamber to rotationally, radially, and longitudinally position the ferrule relative to the housing. In this embodiment, the plurality of optical fiber connectors include single fiber and multiple fiber connectors, such as the SC, SC-DC™, MT-RJ UNICAM®, and MT-RJ connectors. The system may further include a sleeve for aligning mating ferrules.

DETAILED DESCRIPTION OF THE INVENTION

Figures 1, 2:
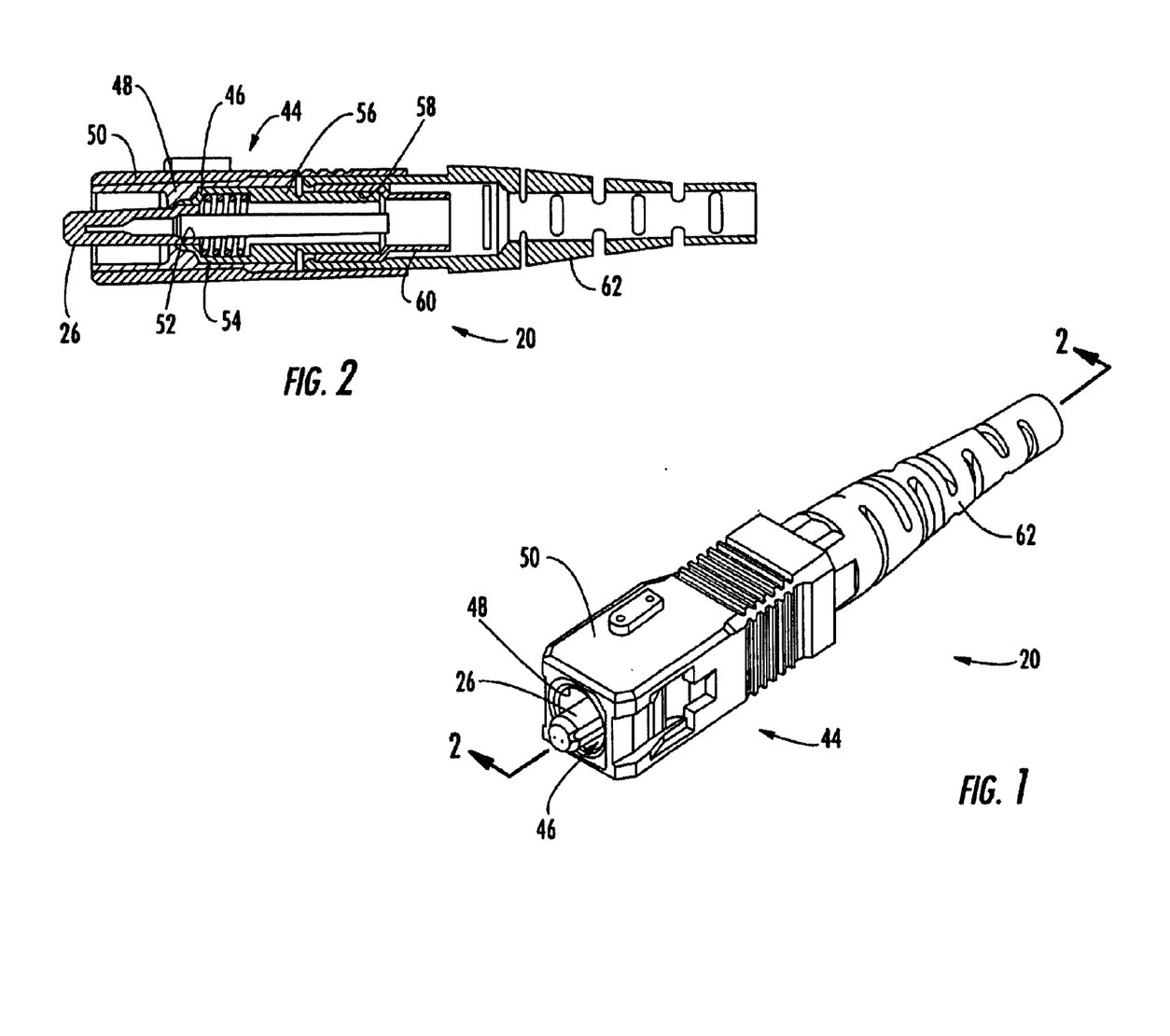
FIG. 1 is a front perspective view of a first connector according to the present invention, including one embodiment of a universal ferrule extending through a first end of the housing of the connector.
FIG. 2 is a longitudinal cross-sectional view of the connector of FIG. 1 taken along line 2—2.
Figures 3, 4, 5:
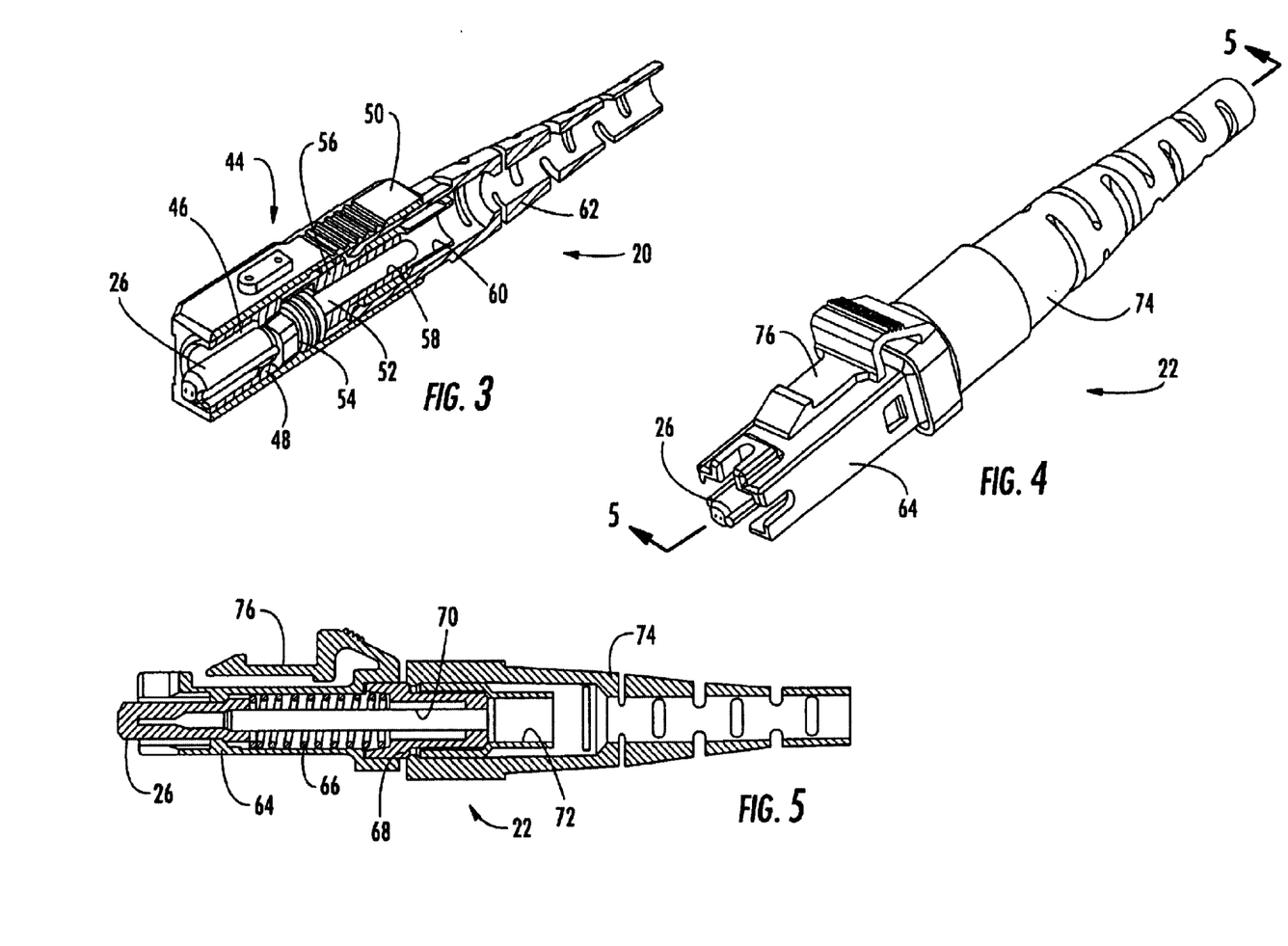
FIG. 3 is a partial cross-sectional perspective view of the connector of FIG. 1 taken along line 2—2 with a full view of the universal connector.
FIG. 4 is a front perspective view of a second connector according to the present invention, including one embodiment of a universal ferrule extending through a first end of the housing of the connector.
FIG. 5 is a longitudinal cross-sectional view of the connector of FIG. 4 taken along line 5—5.
Figure 6:
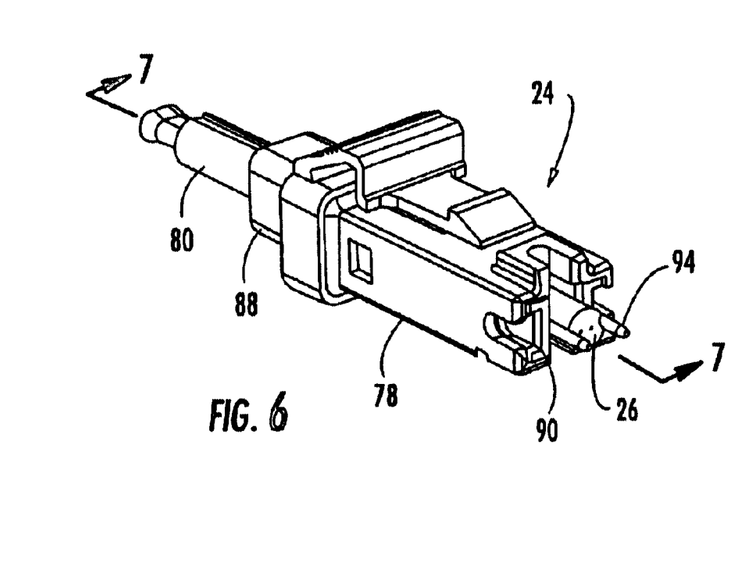
FIG. 6 is a front perspective view of a third connector according to the present invention, including one embodiment of a universal ferrule extending through a first end of the housing of the connector.

According to embodiments of the present invention, referring to FIGS. 1, 4, and 6, optical fiber connectors 20, 22, and 24 of varying types include a universal ferrule 26 for receiving and positioning one or more optical fibers. Universal ferrule 26 is advantageously sized and shaped to be disposed within the internal chamber of the connector housing of most fiber optic connectors. In preferred connectors 20, 22, and 24 are SC-DC™, MT-RJ and MT-RJ UNICAM® connectors, respectively, for terminating optical fibers. Universal ferrule 26 fits within multiple connector housings such that the first end of the ferrule is exposed through the first end of the connector. Thus, universal ferrule 26 is interchangeable among a plurality of connector housings, thereby facilitating ferrule interchangeability and reducing costs in manufacturing, supplying, and servicing of optical fiber connectors.

Figure 8:
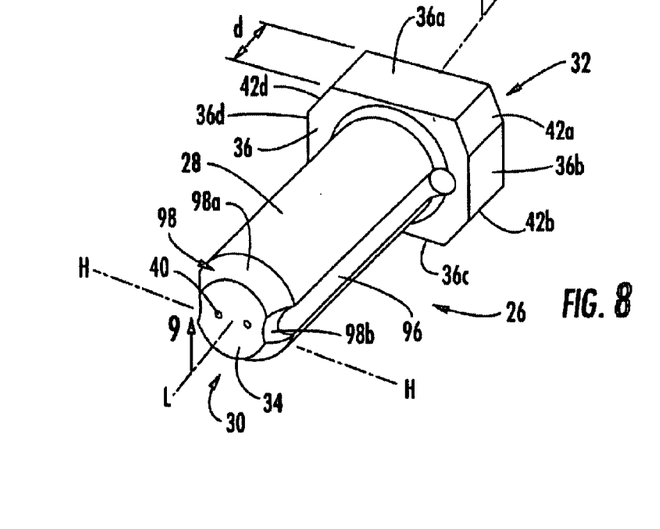
FIG. 8 is a front perspective view of one embodiment of a universal ferrule of the present invention.
Figure 9:
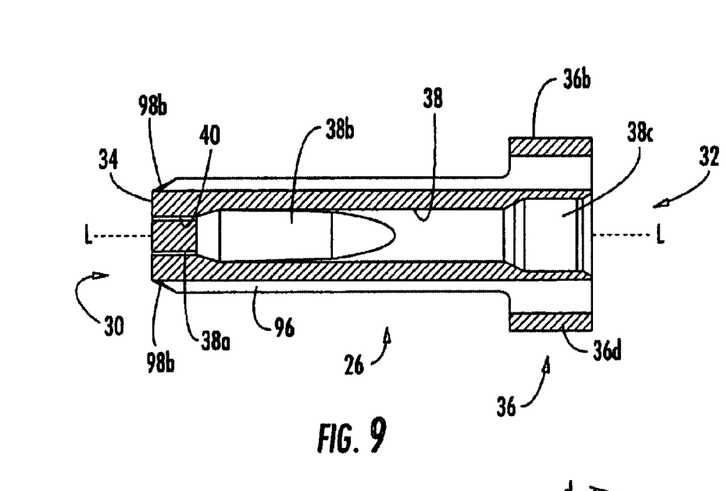
FIG. 9 is a longitudinal cross-sectional view of the universal ferrule of FIG. 8 taken along line 9—9.
Figure 10:
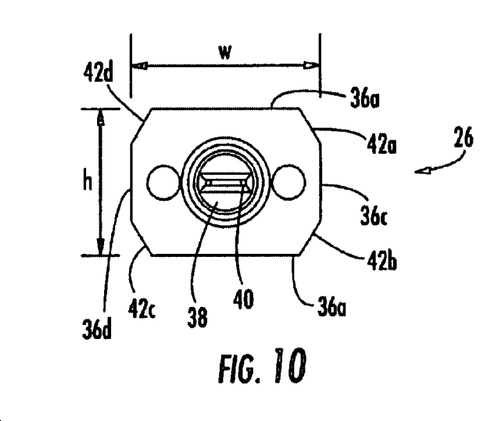
FIG. 10 is a rear plan view of the ferrule of FIG. 8.

Referring to FIGS. 8–10, universal ferrule 26 includes ferrule body 28 longitudinally extending between first end 30 and second end 32. Preferably, ferrule body 28 is generally cylindrical, although rectangular, square, or other shaped bodies may similarly be utilized depending on their application. End face 34 for interfacing with a corresponding ferrule is positioned at first end 30. Base 36, adapted to fit within a plurality of connector types, is positioned at second end 32. Ferrule body 28 defines an internal passageway 38 for receiving one or more optical fibers. Internal passageway 38 opens at second end 32 and longitudinally extends, generally parallel to axis L-L, through the ferrule body 28. Internal passageway 38 preferably includes front, mid, and back cavity portions 38a, 38b, and 38c, respectively, preferably sized in a stepwise fashion to receive and position at least one optical fiber. In the embodiment shown, ferrule 26 is configured to receive two optical fibers. Front and back cavity portions 38a and 38c, respectively, are positioned adjacent first end 30 and second end 32, respectively, with the back cavity portion preferably larger in size than the front cavity portion. Similarly, mid cavity portion 38b is positioned between front and back cavity portions 38a and 38c, respectively, and is preferably larger in size than the front cavity portion, but smaller in size than the back cavity portion. The decreasing size of internal passageway 38 assists in inserting one or more optical fibers through second end 32 and positioned within universal ferrule 26.

Further, front cavity portion 38a has at least one bore 40 that opens at end face 34 to secure at least optical fiber or fiber optic stub on universal ferrule 26. In the embodiments illustrated herein, for example, two bores are included in the ferrule. However, any number of bores may be used, depending on the desired number of optical fibers to be terminated. Bores 40 open at first end 30 and longitudinally extend rearwardly, where the bores 40 join into a single cavity or portion 38b. Portion 38b joins portion 38c, which, in turn, is larger yet. As can be seen in FIGS. 9 and 10, portion 38c is relatively round, and portion 38b, slopes inward from a round shape to a relatively rectangular shape, essentially mimicking the shape of a screw driver. However, it should be noted that bores 40 may extend partially or entirely through the ferrule body 28, eliminating any or all of the portions 38a–c. Bores 40 are dimensioned to accurately position the optical fibers at end face 34 so that the optical fibers may be precisely aligned with a corresponding optical fibers of a mating ferrule.

Figure 12:
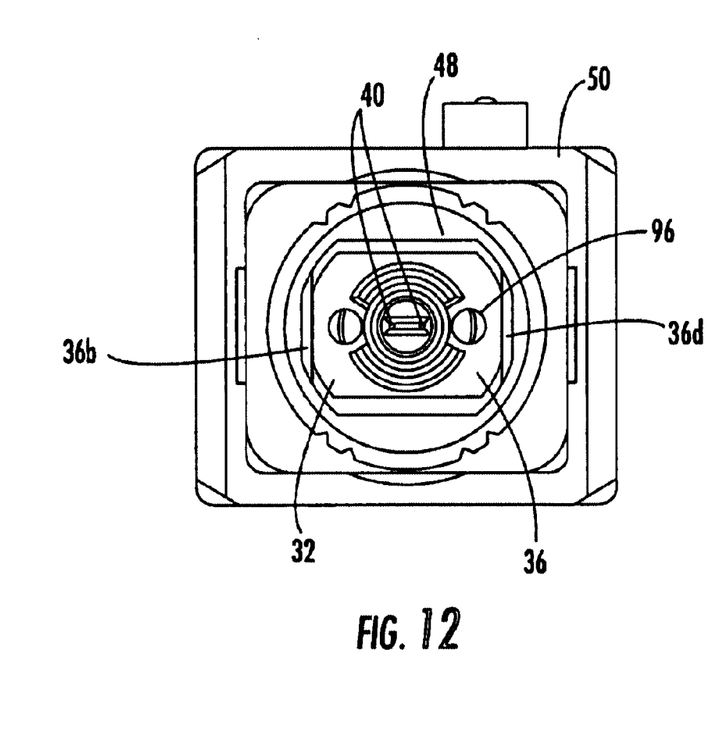
FIG. 12 is a rear view of the ferrule of FIG. 8 in an SC-DC connector housing.

Further, base 36 extends radially outward from ferrule body 28 and is dimensioned to rotationally and longitudinally position universal ferrule 26 and hence the opening of bores 40 at end face 34 relative to the connector housing. As used herein, the term "rotational positioning" refers to an angular positioning about longitudinal axis L-L, while "longitudinal positioning" refers to a lengthwise positioning along axis L-L. As discussed in more detail below with respect to FIGS. 12 and 13, base 36 is preferably sized and shaped to engage an internal chamber of the connector housing. In particular, base 36 is sized and shaped to interchangeably engage the internal chamber of SC-DC™, MT-RJ and MT-RJ UNICAM® connector housings and their structural equivalents. See, e.g., FIGS. 12 and 13. As illustrated in FIG. 8, base 36 preferably has four substantially flat sides 36a–d. Edges 42a–d connect the respective flat sides 36a–d, and the edges are preferably radiused to flexibly allow universal ferrule 26 to interchangeably fit within square, rectangular, arcuate, and/or round connector housings. Sides 36a–d of base 36 thereby engage the internal chamber of the connector housing to rotationally and longitudinally position universal ferrule 26. See FIGS. 12 and 13. As opposed to prior art ferrules having round cylindrical ferrule bodies with a corresponding round base, base 36 of the present invention advantageously allows universal ferrule 26 to be properly angularly oriented in order to insert the universal ferrule within the connector housing. This angular orientation insures the proper angular positioning of bore 40, and thus aids in the alignment of optical fibers with corresponding optical fibers of a mating ferrule. Further, the substantially flat sides 36a–d preferably prevent the rotation of universal ferrule 26 within the connector housing. Depending on the internal configuration of the connector housing to be used, all four sides or only two sides (as illustrated) may be of equal length. As seen in the preferred embodiment illustrated in FIGS. 8–10, sides 36a and 36c have a width w that is greater than the height h of sides 36b and 36d. If two of the sides are to be longer than the others, the longer sides are preferably parallel to the plane in which bores 40 lie. (H-H in FIG. 8). Although this embodiment includes four substantially flat sides, base 36 preferably includes at least two sides having substantially flat portions to assist in preventing the ferrules from rotating in the connector housing. Further, the substantially flat portions may cover an entire side of base 36, or only a part of the side.

The components of universal ferrule 26 are preferably integral, being comprised of a single piece of material. For example, universal ferrule 26 may be formed from a thermoplastic material, such as a polyetherimid resin including the ULTEM® material available from the General Electric Company or the RADEL® material available from Amoco Corporation. Alternatively, universal ferrule 26 may be formed from a ceramic material, such as a glass impregnated ceramic material.

As mentioned above, universal ferrule 26 may be interchangeably used with a plurality of connectors. The plurality of connectors usually have a number of similar components. For example, referring to FIGS. 1–3 and 12, universal ferrule 26 is secured within SC-DC™ connector 20. SC-DC connector 20 includes housing 44 having internal chamber 46 for receiving universal ferrule 26. Housing 44 may comprise inner housing 48 fixedly positioned within the internal chamber defined by coupler 50. Inner housing 48 is adapted to engage universal ferrule 26, and particularly base 36, to provide the rotational and longitudinal alignment of the ferrule when the ferrule is not engaged with another ferrule in an adapter sleeve. As known to those in the art, the ferrule 26, when engaging a corresponding ferrule is able to "float" relative to housing 44 and inner housing 48. Similar to universal ferrule 26, housing 44, inner housing 48, and coupler 50 are preferably formed from a plastic material. Further, connector 20 may comprise lead-in tube 52 having a first end that is disposed within second end 32 of universal ferrule 26. Lead-in tube 52, preferably formed from a metallic material, directs the one or more optical fibers longitudinally into internal passageway 38 of universal ferrule 26.

Universal ferrule 26 is resiliently biased toward engagement with internal chamber 46 by spring member 54. While illustrated as a round spring, spring member 54 may include other types of springs, such as a helical spring, or other resilient materials forming a resilient member. Preferably, spring member 54 is compressively held between ferrule 26 and a first end of crimp body 56. Crimp body 56 may have radially extending teeth 58 for engaging the internal chamber of inner housing 48 to prevent twisting of the optical cable carrying the optical fibers. Also, crimp band 60 encompasses a second end of crimp body 56 and provides strain relief to the optical cable so that force exerted on the cable downstream from the connector does not affect the one or more optical fibers within the connector housing. Finally, boot 62 defines and internal passageway for receiving a cable containing one or more optical fibers. Boot 62 surrounds crimp body 56 and, in some embodiments, threadedly engages the second end thereof, to prevent the optical fiber cable from violating the bending radius that would break the optical fibers within the cable.

Figure 13:
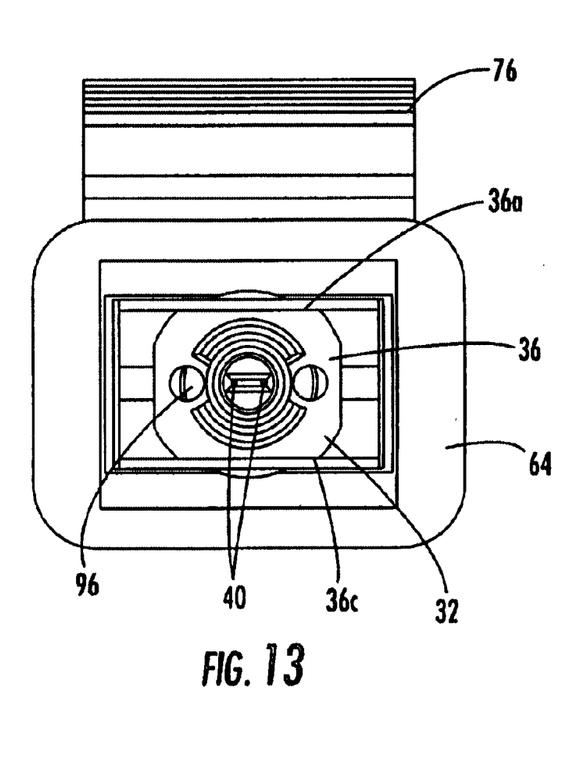
FIG. 13 is a rear view of the ferrule of FIG. 8 in an MT-RJ connector housing.

Similarly, referring to FIGS. 4, 5, and 13, universal ferrule 26 is disposed within housing 64 of MT-RJ connector 22. Housing 64 defines an internal chamber adapted to receive and position universal ferrule 26 relative to the housing. Biasing means 66, such as a spring, is compressively held between housing 64 and crimp body 68. Crimp body 68 is fixedly mounted within the second end of housing 64, such as by retaining tabs, press fit, adhesives, or other similar methods. Further, lead-in tube 70 engages second end 32 of universal ferrule 26 and is further disposed within an internal chamber defined by crimp body 68. A crimp band 72 is secured to a second end of crimp body 68 and, like the first embodiment, provides strain relief. Boot 74 slides over and is secured on crimp band 72 to assist in preventing a violation of the bend radius of the cables. Finally, housing 64 further includes external clip 76 for securing engagement with a mating connector.

Figure 7:
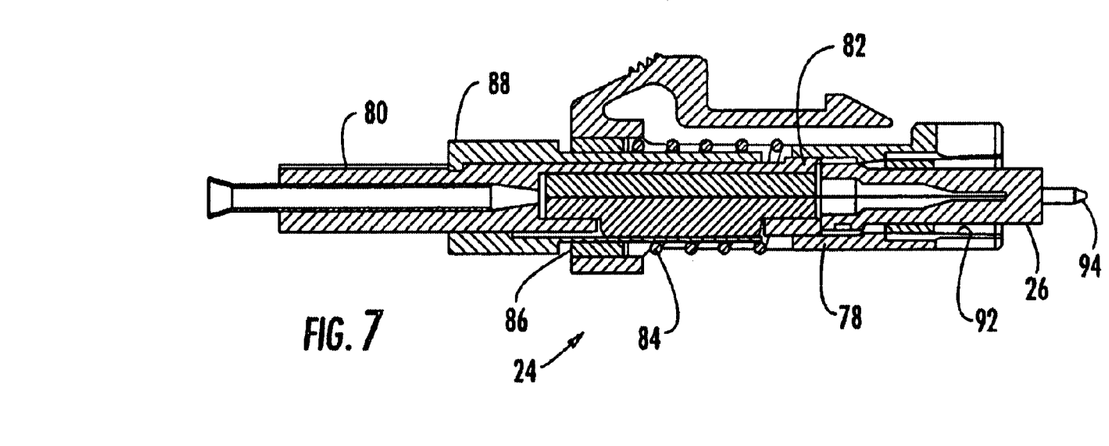
FIG. 7 is a longitudinal cross-sectional view of the connector of FIG. 6 taken along line 7—7.

Also similarly, referring to FIGS. 6 and 7, universal ferrule 26 is disposed within housing 78 of MT-RJ UNICAM® connector 24. Connector 24 includes ferrule holder assembly 80 extending longitudinally within an internal chamber defined by housing 78. Ferrule holder assembly 80 comprises ferrule base holder 82 at a first end and adapted to receive and engage base 36 of universal ferrule 26. Further, biasing mechanism 84, such as a spring, is positioned surrounding ferrule holder assembly 80 and adjacent to spring push mechanism 86. Spring push mechanism 86 defines a cavity through which cam 88 longitudinally extends. Cam 88 further defines a cavity for receiving the second end, opposite ferrule base holder 82, of ferrule holder assembly 80. Further, first end 30 of universal ferrule 26 may optionally be secured within external pin keeper assembly 90 at the first end of connector 24. Pin keeper assembly 90 defines an internal cavity 92 for receiving ferrule body 28. Guide pins 94 are longitudinally positioned and partially exposed within an internal cavity. Guide pins 94 engage corresponding grooves 96 (see FIG. 8) defined by the external surface of ferrule body 28 in order to properly orient the one or more bores 40 at end face 34. The operation of the connector and cam are discussed in detail in U.S. Pat. No. 5,040,867, incorporated herein in its entirety by reference.

Referring again to FIG. 8, for example, the external surface of ferrule body 28 may define one or more longitudinal grooves 96. Longitudinal grooves 96 preferably run the length of ferrule body 28 and extend radially inward. Preferably, longitudinal grooves 96 have a radius or other shape corresponding to the radius of an engaging guide pin, rib, or other similar alignment member. Longitudinal grooves 96 may also comprise substantially flat surfaces forming other channel-like shapes, such as rectangular, square, arcuate, and v-shapes that may be in an adapter sleeve. Also, grooves 96 extend through base 36 forming passageways for alignment members, which may be inserted from the rear face when a pin keeper 92 is not used. Grooves 96 aid in initiating a connection between two mating connectors by receiving the alignment members. Further, since grooves 96 and the corresponding alignment members cooperate to define the orientation of the one or more bores 40, the grooves 96 provide additional positioning and alignment of mating optical fibers. In the prefered embodiment, the grooves are spaced similar to those in the MT-RJ ferrule thereby allowing mating with an MTRJ ferrule that has preinserted guide pins To further facilitate interfacing mating connectors, referring to FIGS. 8, 9 and 11, end face 34 of universal ferrule 26 defines a chamfered edge 98 with ferrule body 28. Chamfered edge 98 comprises a first chamfered portion 98a and a second chamfered portion 98b. First chamfered portion 98a is defined at the outer peripheral edge between end face 34 and ferrule body 28. Meanwhile, second chamfered portion 98b is defined at the edge of end face 34 and one or more grooves 96. Second chamfered portion 98b interacts with alignment members to allow for slight misalignment and receive the alignment member when mating two ferrules. For example, universal ferrule 26 may be connected to another ferrule utilizing a coupling sleeve 100. Coupling sleeve 100 has opposed first and second ends 100a and 100b, respectively, and defines a bore 102 opening at both ends and longitudinally extending therethrough. Bore 102 is sized and shaped to receive first end 30 of universal ferrule 26 at first end 100a of coupling sleeve 100. Similarly, second end 100b of sleeve 100 is adapted to receive a corresponding ferrule for mating with universal ferrule 26. Further, the internal surface of bore 102 also includes at least one alignment member 103 longitudinally extending at least partially along the length of sleeve 100. Alignment member 103 is dimensioned to engage groove 96 of universal ferrule 26 and insures alignment between mating optical fibers. Alignment member 103 may be integrally formed with sleeve 100, such as by molding or machining, or alignment member 103 may comprise flanges or pins that are secured to the internal surface of bore 102.

Figure 11:
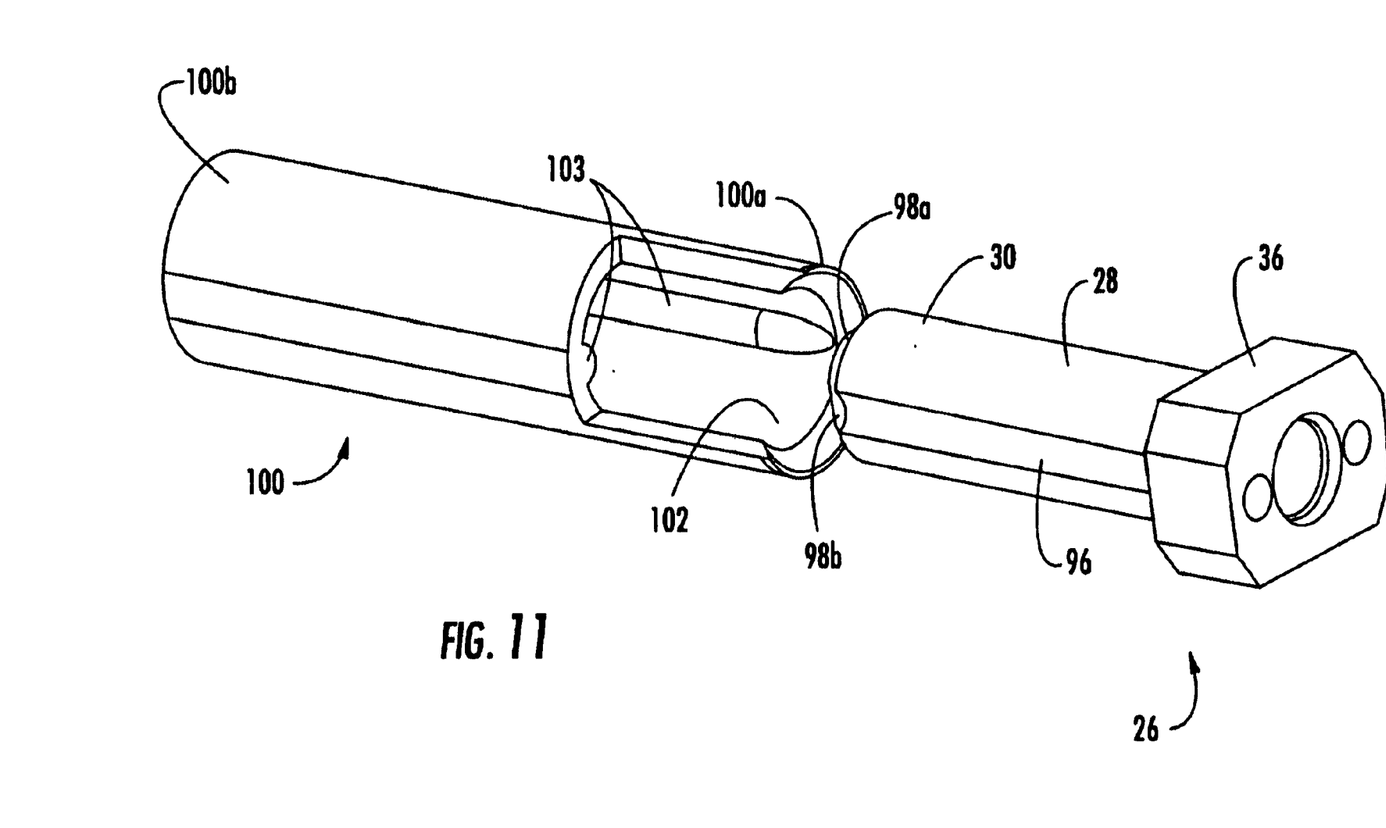
FIG. 11 is a perspective view of the ferrule of FIG. 8 being inserted into a coupling sleeve having alignment members.

Coupling sleeve 100 and alignment member 102 generally are formed of plastic, metallic, or ceramic materials that typically have a hardness greater than that of the material of universal ferrule 26. As such, when initially installing first end 30 of universal ferrule 26 within coupling sleeve 100, any misalignment of their respective longitudinal axes may lead to skiving of material from the external surface of the ferrule. Since the positioning of the one or more bores 40 is determined relative to the bores 96 external surface of ferrule body 28, this skiving of material may lead to misalignment between mating optical fibers. As such, chamfered edge 98, and particularly first chambered portion 98a, allows for some misalignment between the longitudinal axes of coupling sleeve 100 and universal ferrule 26 upon initial insertion of the ferrule into the coupling sleeve. Further, chamfered edge 98 corrects any misalignment by guiding coupling sleeve 100 into longitudinal alignment with ferrule body 28. Chamfered edge 98 is angled from end face 34 in the range of 15 to 45 degrees, preferably in the range of 28 and 32 degrees and most preferably about 30 degrees relative to longitudinal axis L-L.

Similar to the manner in which first chamfered portion 98a interacts with coupling sleeve 100 described above in reference to chamfered edge 98, second chamfered portion 98b interacts with alignment members, such as ribs or guide pins. Guide pins 94 (FIG. 6), typically comprising a metallic material, are generally harder than the material comprising ferrule body 28. As such, misalignment between pin 94 and groove 96 can cause removal of material from the groove. Since groove 96 is used to position the one or more bores 40, this removal of material may lead to misalignment of mating optical fibers. The angle of second chamfered portion 98b is dimensioned to correspond to the angle on, for example, the engaging guide pin 94 or alignment member 103 (FIG. 11). Typically, the angle of chamfered portion 98b is in the range of about 10 to 30 degrees, and preferably in the range of about 15 to 25 degrees relative to the surface of groove 96. Therefore, second chamfered portion 98b is angled to allow for and correct misalignment between one or more groove 96 and guide pins 94 or alignment members 103.

Figures 14, 15, 16:
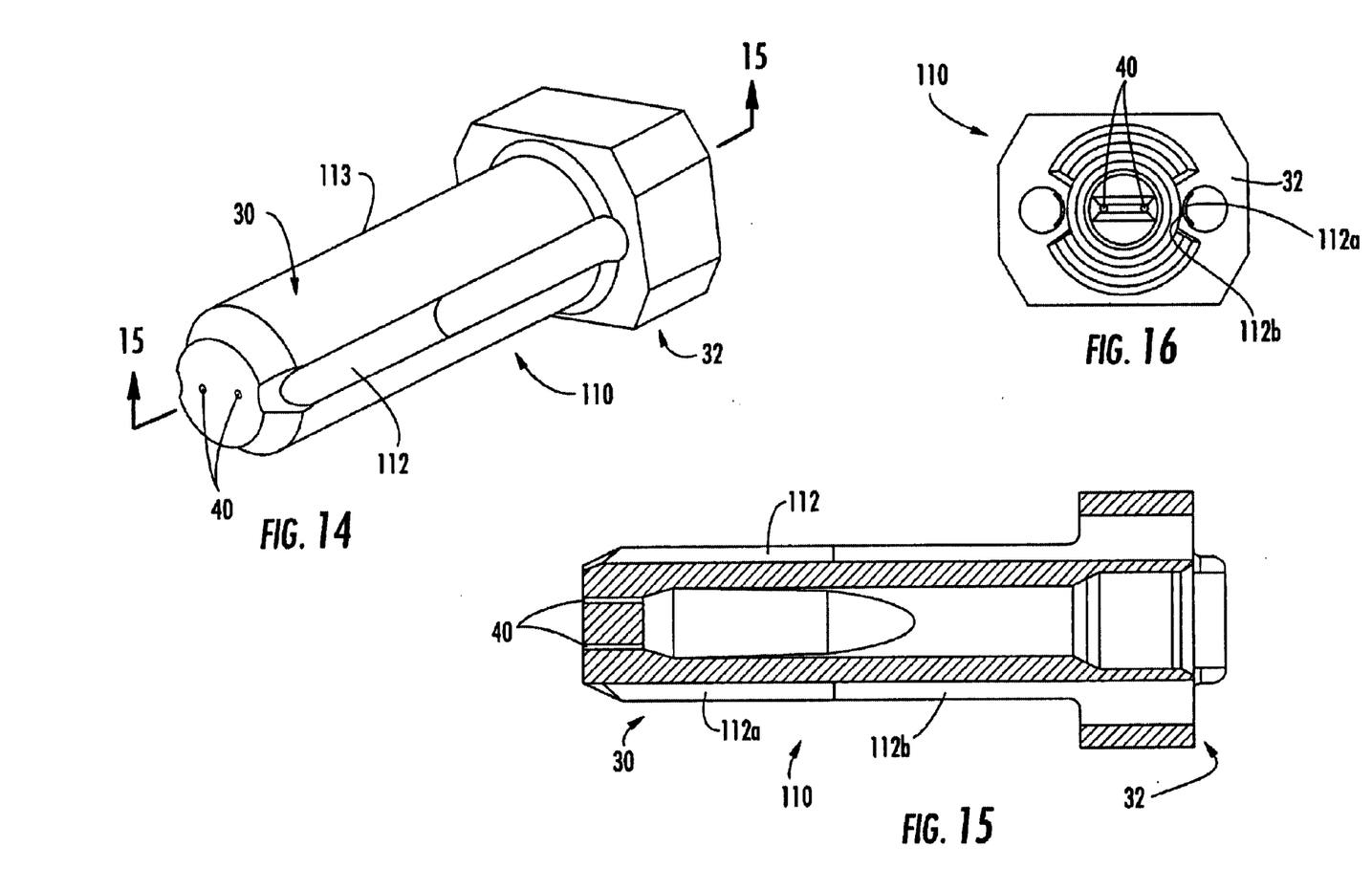
FIG. 14 is a front perspective view of another embodiment of a universal ferrule of the present invention having enhanced alignment features.
FIG. 15 is a longitudinal cross-sectional view of the universal ferrule of FIG. 14 taken along line 15—15.
FIG. 16 is a rear plan view of the ferrule of FIG. 14.

In another advantageous embodiment, referring to FIGS. 14–16, a universal ferrule 110 has one or more grooves 112 defined by the external surface of ferrule body 113. Each of the one or more grooves 112 include a first groove portion 112a adjacent to first end 30 and a second groove portion 112b adjacent to second end 32. Because the one or more grooves 112 interact with one or more guide pins or alignment members to define a positioning of one or more bores 40, a precise relationship between the grooves and the bores is required. The tolerances required to maintain such a relationship for the full longitudinal length of a groove may be difficult to maintain, however, especially when the ferrule is comprised of a plastic material. This full length engagement of guide pins or alignment members to the ferrule is not required, however, as only a portion of the full length of a groove needs to engage a corresponding portion of one or more guide pins and still maintain accurate positioning of one or more bores. As such, each first groove portion 112a is sized and shaped to engage the corresponding guide pin or alignment member. The first groove position 112a is preferred to be three times the diameter of the guide pin to hold the ferrule in alignment. If the first position 112a is radiused incorrectly (is too shallow) towards the rear of ferrule, then guide pins inserted from the rear 32 would be pushed outward from the ferrule near the front 30 and will not be in contact with the front end of the ferrule. Such a condition would allow the front of the ferrule to move relative to another ferrule and optical fibers may not be properly aligned. Therefore, second groove portion 112b is sized and shaped to be larger than first groove portion 112a such that second groove portion does not engage the guide pin or alignment member. Second groove portion 112b thereby extends radially inwardly a greater amount than first groove portion 112a to provide clearance for the guide pin or alignment member, for example. In particular, for a round shaped groove, second groove portion 112b has a greater radius than first groove portion 112a, where both groove portions are positioned based on their respective radii from a longitudinal axis that runs parallel to the longitudinal groove, such as L-L. As a result, the positioning of the one or more bores 40 is provided exclusively by first groove portion 112a. As discussed above regarding groove 96, groove 112 may be any shape useful for orienting the optical fibers of mating ferrules. Thus, groove 112 of universal ferrule 110 has first and second groove portions 112a and 112b, respectively, that cooperate to position one or more bores 40 without requiring high tolerances to be maintained along the entire longitudinal length of the groove.

Therefore, the present invention includes a universal ferrule adapted for interchangeable use with a plurality of optical fiber connectors. In particular, the universal ferrule has a base that is adapted to engage the inner chamber of the connector housing for each type of connector and rotationally, radially and longitudinally positions one or more bores at the end face of the ferrule. The accurate positioning of the one or more bores insures low insertion loss between mating ferrules. Additionally, the present invention includes enhanced alignment features for mating ferrules by providing a ferrule with a longitudinal groove having first and second groove portions. The first groove portion is utilized to position the mating ferrules, while the second groove portion provides clearance so that high tolerances are not required along the full length of the groove. Thus, the present invention provides a universal ferrule that fits within a multiplicity of connector housings and has enhanced alignment features.

Although the invention has been described with reference to these preferred embodiments, other embodiments can achieve the same results. As such, variations and modifications of the present invention will be apparent to one skilled in the art and the following claims are intended to cover all such modifications and equivalents.

What is claimed is:

1. A ferrule for positioning at least one optical fiber within an optical fiber connector housing, comprising:
   a longitudinal body having an end face at a first end and a base at a second end;
   said longitudinal body defining at least one longitudinal bore extending between said first and second ends for receiving said at least one optical fiber; and
   said base adapted to interchangeably engage a single fiber connector housing and a multiple fiber connector housing to position said ferrule relative to said connector housing.

2. The ferrule according to claim 1, wherein said base is adapted to rotationally position said ferrule and said at least one bore relative to said optical fiber connector housing.

3. The ferrule according to claim 1, wherein said base comprises at least two substantially flat portions.

4. The ferrule according to claim 3, wherein said at least two substantially flat portions are adapted to engage a corresponding structure in said connector housing to prevent rotation of said ferrule relative to said connector housing.

5. The ferrule according to claim 1, wherein said longitudinal body comprises a substantially cylindrical longitudinal exterior surface extending from said end face to said base.

6. The ferrule according to claim 1, wherein said longitudinal body comprises a substantially cylindrical longitudinal exterior surface extending from said end face to said base, and wherein said base comprises at least two substantially flat side portions.

7. The female according to claim 1, wherein said plurality of types are selected from the group consisting of an SC, an SC-DC™, an MT-RJ, and a UNICAM® connector housing.

8. The ferrule according to claim 1, wherein said end face is chamfered.

9. By The ferrule according to claim 1, wherein said longitudinal body further includes at least one longitudinal groove.

10. The ferrule according to claim 7, wherein said end face has a chamfered edge, wherein said chamfered edge has a first chamfered portion and a second chamfered portion, and wherein said second chamfered portion is adjacent to said at least one longitudinal groove.

11. The ferrule according to claim 1, wherein said longitudinal body further includes at least one longitudinal groove, wherein said at least one groove has a first groove portion adjacent to said first end and a second groove portion adjacent to said second end, wherein said first groove portion is adapted to position said ferrule relative to a mating ferrule.

12. The ferrule according to claim 10, wherein said first groove portion has a first radius and said second groove portion his a second radius.

13. The ferrule according to claim 12, wherein said first radius is smaller than said second radius.

14. A ferrule for positioning at least one optical fiber within an optical fiber connector housing, comprising:
   a longitudinal body having an external surface, an end face at a first end and a base at a second end;
   said longitudinal body defining at least one longitudinal bore, in communication with said end face, for receiving said at least one optical fiber;
   said longitudinal body including at least one longitudinal groove extending along said external surface, wherein said groove has a first groove portion adjacent to said first end and a second groove portion adjacent to said second end, and wherein said first groove portion is adapted to position said ferrule relative to a mating ferrule; and
   wherein said optical fiber connector housing includes a plurality of types of connector housings, and wherein said base is adapted to fit within each of said plurality of types of connector housings to radially and rotationally position said ferrule and said at least one bore relative to said optical fiber connector housing.

15. The ferrule according to claim 14, wherein said first groove portion is smaller in size than said second groove portion.

16. The ferrule according to claim 14, wherein said plurality of types of connector housings are selected from the group consisting of a single fiber connector housing and a multiple fiber connector housing.

17. The ferrule according to claim 14, wherein said plurality of types of connector housings are selected from the group consisting of an SC, an SC-DC™, an MT-RJ, and a UNICAM® connector housing.

18. The ferrule according to claim 14,further comprising:
   a chamfered edge between said end face and said longitudinal body, wherein said chamfered edge has a first chamfered portion and a second chamfered portion, wherein said second chamfered portion is adjacent said at least one longitudinal groove.

19. A system for terminating an optical fiber cable having at least one optical fiber, said system comprising:
   a connector type selected from a plurality of optical fiber connectors from the group consisting of a single fiber connector and a multiple fiber connector, wherein each of said plurality of optical fiber connectors comprises a housing defining an internal chamber for receiving said at least one optical fiber; and
   a ferrule adapted for insertion within said internal chamber, said ferrule having a longitudinal body with an end face at a first end and a base at a second end, said longitudinal body defining at least one longitudinal bore extending between said first and second ends for receiving said at least one optical fiber; and said base adapted to interchangeably engage said internal chamber of each said connector type to position said ferrule relative to said housing.

20. The system according to claim 19, wherein said plurality of connectors are selected from the group consisting of an SC connector, an SC-DC™ connector, and an MT-RJ connector.

21. The system according to claim 21, wherein said longitudinal body further includes at least one longitudinal groove.

22. The system according to claim 21, further comprising a chamfered edge between said end face and said longitudinal body, wherein said chamfered edge has a first chamfered portion and a second chamfered portion, wherein said second chamfered portion is adjacent said at least one longitudinal groove.

23. The system according to claim 19, wherein said longitudinal body further includes at least one longitudinal groove, wherein said groove has a first groove portion adjacent said first end and a second groove portion adjacent said second end, wherein said first groove portion is adapted for positioning said at least one longitudinal bore relative to a mating ferrule.

24. The system according to claim 23, wherein said first groove portion has a first radius and said second groove portion has a second radius.

25. The system according to claims 23, wherein said first radius is smaller than said second radius.

26. A ferrule for positioning at least one optical fiber within an optical fiber connector housing, comprising:

longitudinal body having an external surface, an end face at a first end and a base at a second end;

said longitudinal body defining at least one longitudinal bore, in communication with said end face, for receiving said at least one optical fiber; and said longitudinal body including at least one longitudinal groove extending along said external surface, wherein said groove has a first groove portion adjacent to said first end and a second groove portion adjacent to said second end, wherein said first groove portion is adapted to position said ferrule relative to a mating ferrule, and wherein said first groove portion is smaller in size than said second groove portion.

27. A ferrule for positioning at least one optical fiber within an optical fiber connector housing, comprising:

a longitudinal body having an external surface, an end face at a first end and a base at a second end;

said longitudinal body defining at least one longitudinal bore, in communication with said end face, for receiving said at least one optical fiber;

said longitudinal body including at least one longitudinal groove extending along said external surface, wherein said groove has a first groove portion adjacent to said first end and a second groove portion adjacent to said second end, and wherein said first groove portion is adapted to position said ferrule relative to a mating ferrule; and a chamfered edge between said end face and said longitudinal body, wherein said chamfered edge has a first chamfered portion and a second chamfered portion, and wherein said second chamfered portion is adjacent said at least one longitudinal groove.

28. A ferrule for positioning at least one optical fiber within an optical fiber connector housing, comprising:

a longitudinal body having an end face at a first end and a base at a second end;

said longitudinal body defining at least one longitudinal bore extending between said first and second ends for receiving said at least one optical fiber; and universal means on said base for fitting the ferrule within a plurality of types of said optical fiber connector housing and for engaging said connector housing to position said ferrule relative to said connector housing;

wherein said plurality of types of said optical fiber connector housing comprise a single fiber connector housing and a multiple fiber connector housing.

29. The ferrule of claim 28, wherein said universal means includes at least two substantially flat surfaces.

30. The ferrule of claim 29, wherein said universal means further includes at least one radiused edge adjacent at least one of the at least two substantially flat surfaces.

* * * * *